United States Patent
Pendleton

(10) Patent No.: US 6,312,151 B1
(45) Date of Patent: Nov. 6, 2001

(54) BULK BAG PRE-CONDITIONER

(75) Inventor: Stevens P. Pendleton, Ramsey, NJ (US)

(73) Assignee: Vac-U-Max, Belleville, NJ (US)

( * ) Notice: Subject to any disclaimer, the term of this patent is extended or adjusted under 35 U.S.C. 154(b) by 0 days.

(21) Appl. No.: 09/498,432

(22) Filed: Feb. 4, 2000

Related U.S. Application Data

(60) Provisional application No. 60/166,988, filed on Nov. 23, 1999.

(51) Int. Cl.$^7$ .................................................. B01F 11/00
(52) U.S. Cl. .......................... 366/332; 366/335; 141/75; 141/77
(58) Field of Search .................................... 366/208, 209, 366/212, 219, 332, 333, 334, 335, 341, 108, 110, 111, 197, 203, 204; 414/415, 283; 141/77, 75, 74, 78, 80; 222/203, 202

(56) References Cited

U.S. PATENT DOCUMENTS

| | | | | |
|---|---|---|---|---|
| 720,053 | * | 2/1903 | McKibben | 141/77 |
| 1,649,362 | * | 11/1927 | Nagel | 141/77 |
| 1,730,295 | * | 10/1929 | Reuther | 141/77 |
| 1,777,224 | * | 9/1930 | Reuther | 141/77 |
| 2,419,330 | * | 4/1947 | Anderson . | |
| 2,781,799 | * | 2/1957 | Bradford | 141/77 |
| 2,863,475 | * | 12/1958 | Lau | 366/108 |
| 3,595,530 | * | 7/1971 | Hubers | 366/332 |
| 3,819,158 | * | 6/1974 | Sharpe et al. . | |
| 4,324,088 | * | 4/1982 | Yamashita et al. . | |
| 4,810,156 | * | 3/1989 | Pendleton et al. | 222/203 |
| 5,271,439 | * | 12/1993 | Alack | 141/77 |
| 5,699,730 | * | 12/1997 | Ogier et al. | 222/203 |
| 5,788,449 | * | 9/1998 | Riemersma | 414/415 |
| 6,142,661 | * | 11/2000 | Lafond | 366/332 |

\* cited by examiner

Primary Examiner—Tony G. Soohoo
(74) Attorney, Agent, or Firm—Norris, McLaughlin & Marcus P.A.

(57) ABSTRACT

An apparatus is provided for pre-conditioning the materials in a bulk bag to effect easier unloading of the materials. A frame is provided with an open space for receiving the bulk bag. A series of spaced-apart, opposing breaker bars is provided for automatic thrusting against the sides of the bags to break up compacted material. The bars preferably have an angled profile. Parallel pairs of opposing horizontal bars are provided, evenly spaced from the bottom; and preferably a single opposing vertical pair is provided on the opposite sides. The pairs of bars are operated, by thrusting into the sides of the bag, in a timed sequence, to effect break up of the material. Additionally, a series of bars may be provided on the bottom of the frame, such that a break up effect is achieved against the material residing in the bottom of the bag.

24 Claims, 4 Drawing Sheets

BULK BAG PRE-CONDITIONER

This application claims benefit of Provisional No. 60/166,988 filed Nov. 23, 1999.

BACKGROUND OF THE INVENTION

The invention relates to the field of handling and storage of materials in bulk bags. In particular, the invention relates to an apparatus for pre-conditioning the material held in a bulk bag, prior to discharge, so as to break up highly compacted material.

An increasingly common method of shipping, storage, and handling commodities is the bulk bag or "super sack". The bags are sewn commonly of a synthetic fabric and generally hold up to approximately 2,000 to 2,200 pounds of product. Typically, they have four lifting loops, an inlet spout on the top which folds over after filling, and a discharge spout on the bottom which is generally folded over and tied, many times within yet another overwrap. An average super sack full of product would range from 36" square to 48" square and anywhere from 36" in height to 72" in height. The "square" is really a misnomer because although the bags are sewn square, the sides bulge significantly as product is filled into them. Many bulk bags also are fit with a liner, customarily a polyethylene tube and liners would frequently be used with products which might tend to be hydroscopic.

Bulk bags are frequently transported over long distances either by ship, truck or rail; and, they frequently stand in a warehouse for an extended period of time before the product is to be used. During transportation and storage, many products become compacted such that the material is a fairly compacted mass in the bag that will not flow from the open spout at the bottom, even after the bags have been dropped to the floor, swung against a pillar, or beat upon with baseball bats. All of these techniques have been tried at one time or another.

The bulk bag pre-conditioner of the invention is designed to replace the less sophisticated and less effective means of breaking up the material in a compacted bag so that it will flow when the bag is opened.

SUMMARY OF THE INVENTION

An apparatus is provided for pre-conditioning the materials in a bulk bag to effect easier unloading of the materials. A frame is provided with an open space for receiving the bulk bag. A series of spaced-apart, opposing breaker bars is provided for automatic thrusting against the sides of the bags to break up compacted material. The bars preferably have an angled profile. Parallel pairs of opposing horizontal bars are provided, evenly spaced from the bottom; and preferably a single opposing vertical pair is provided on the opposite sides. The pairs of bars are operated, by thrusting into the sides of the bag, in a timed sequence, to effect break up of the material. Additionally, a series of bars may be provided on the bottom of the frame, such that a break up effect is achieved against the material residing in the bottom of the bag.

DETAILED DESCRIPTION OF THE INVENTION

Figure 1:
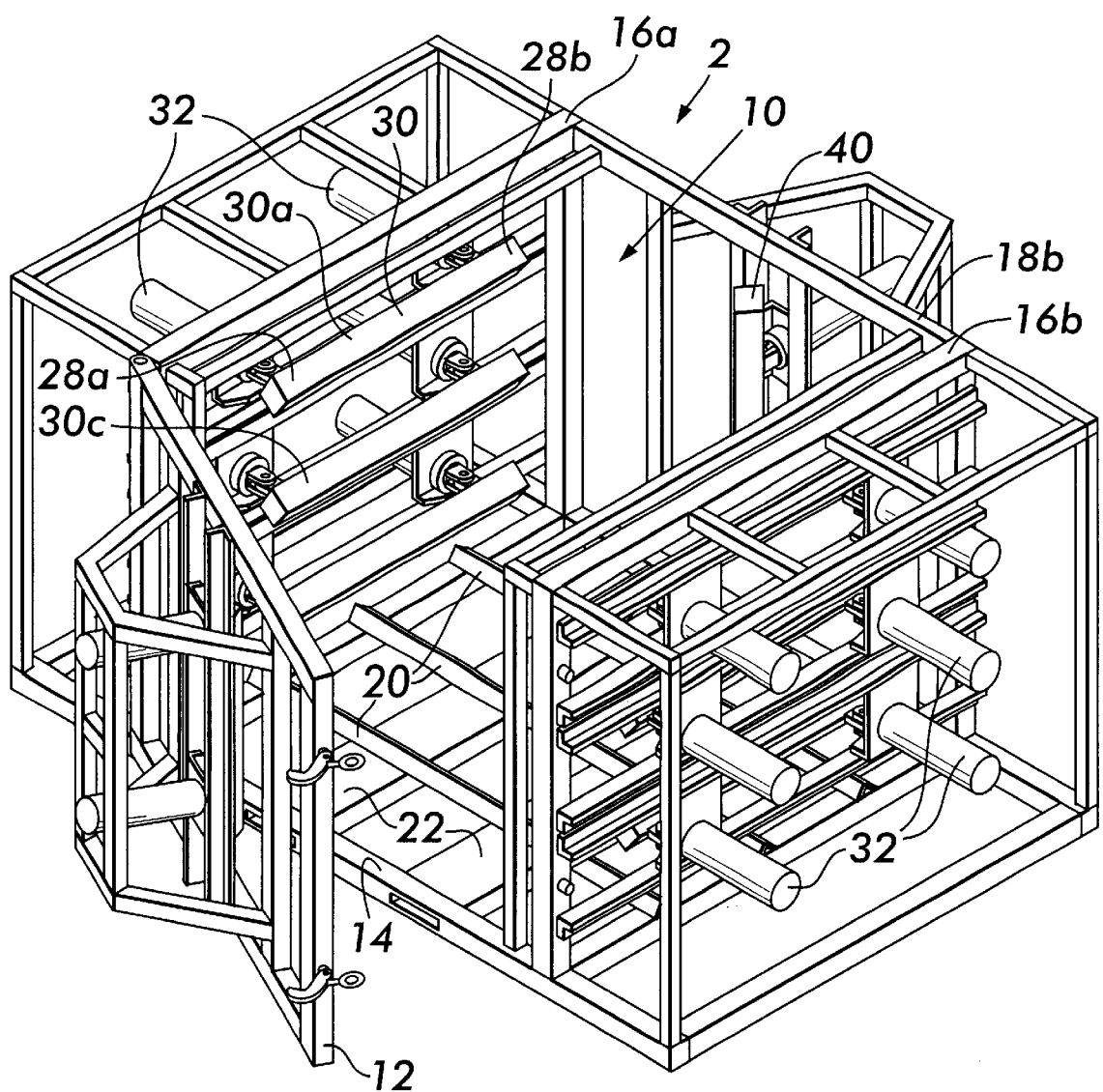
FIG. 1 is a perspective view of the apparatus of the invention.
Figure 2:
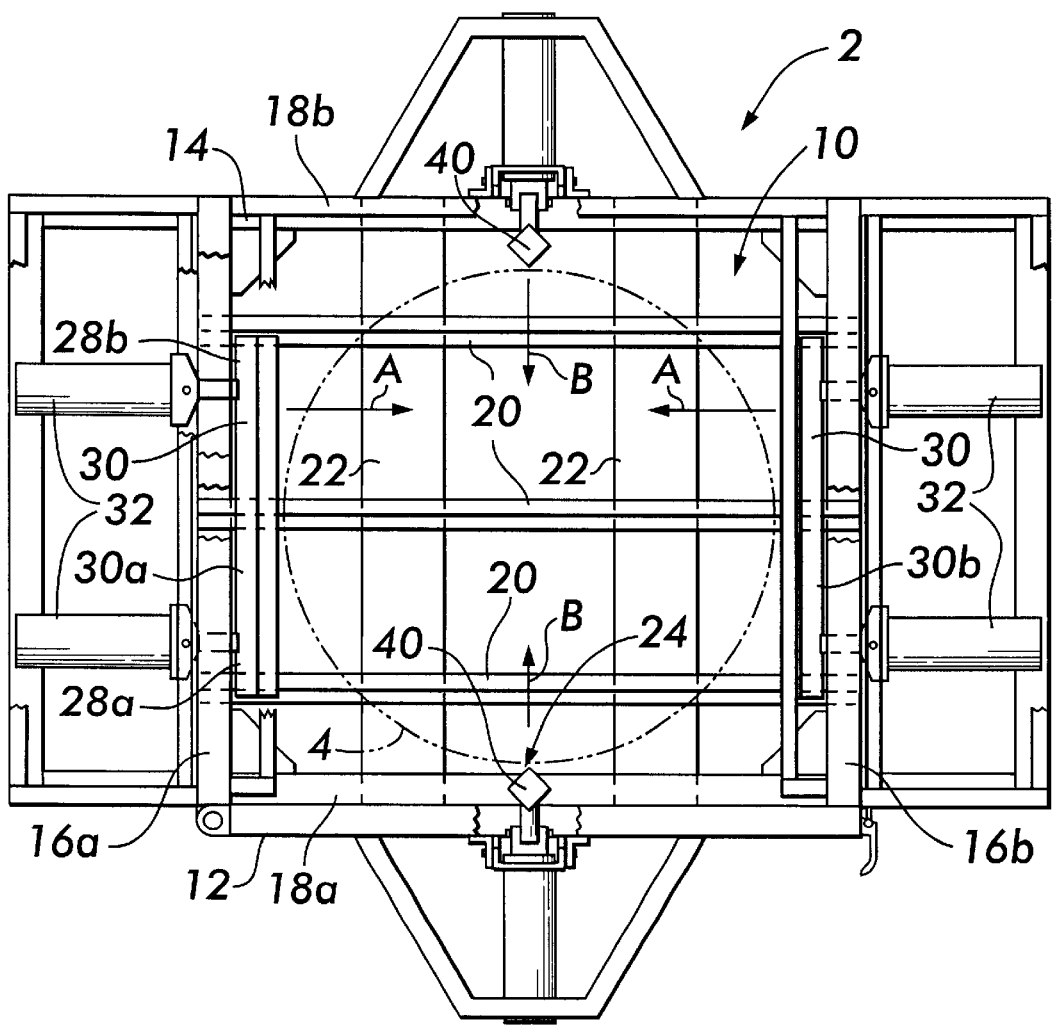
FIG. 2 is a top plan view of the apparatus.
Figure 3:
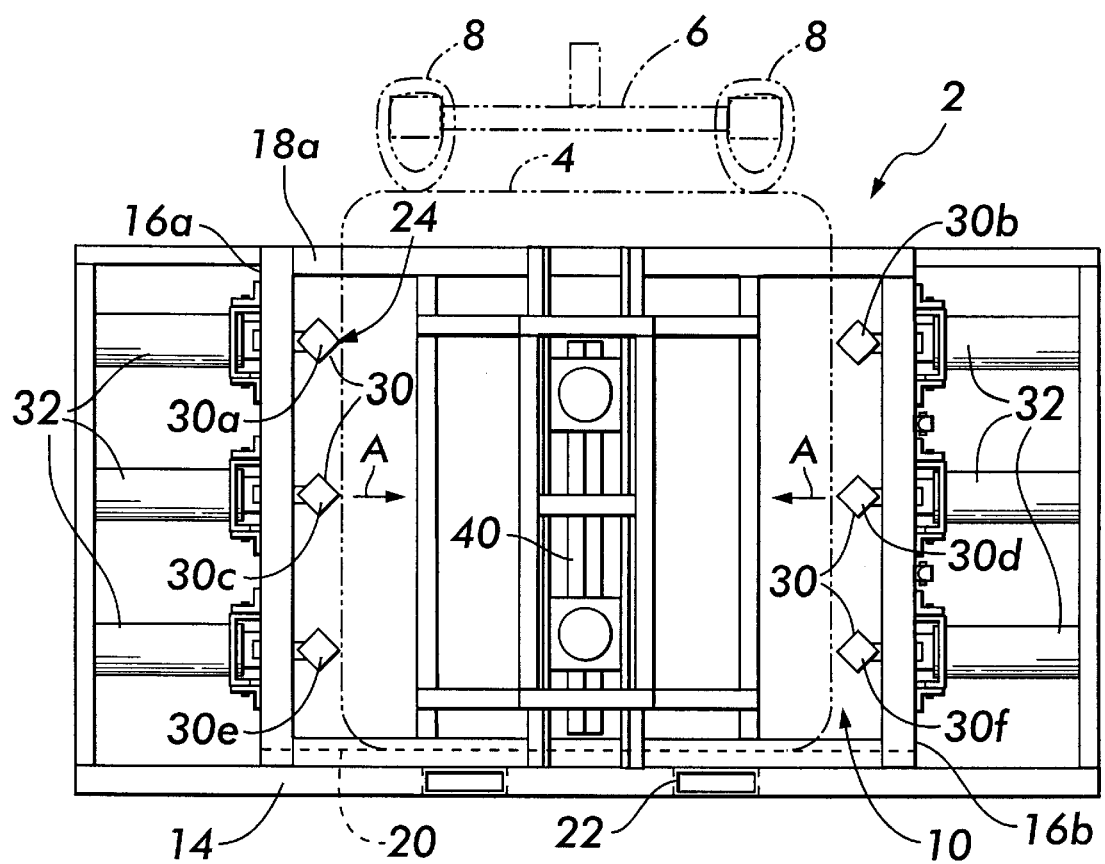
FIG. 3 is a front elevational view of the apparatus.
Figure 4:
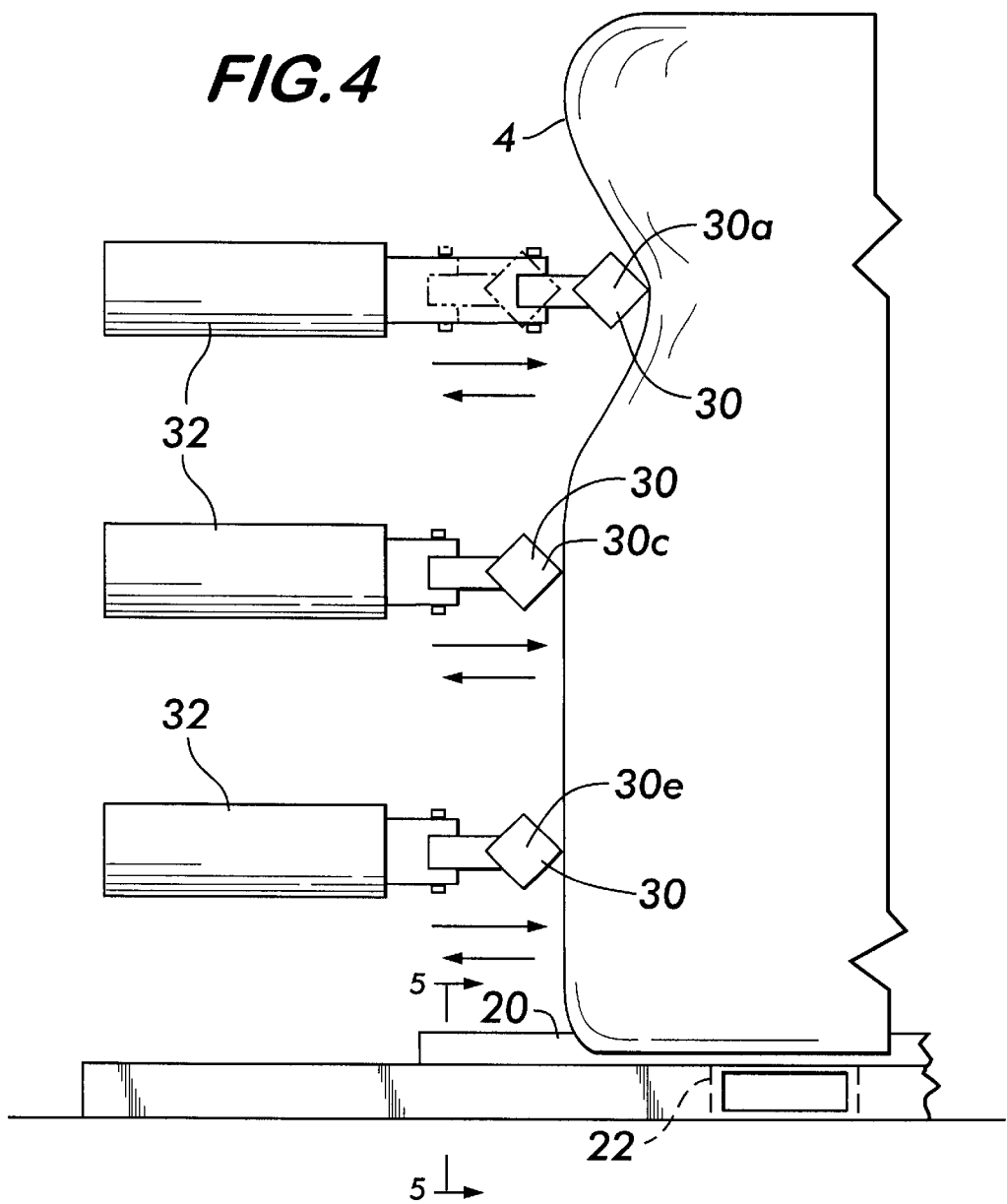
FIG. 4 is close-up front view, showing a bar being thrust into the side of a bag upon actuation.
Figure 5:
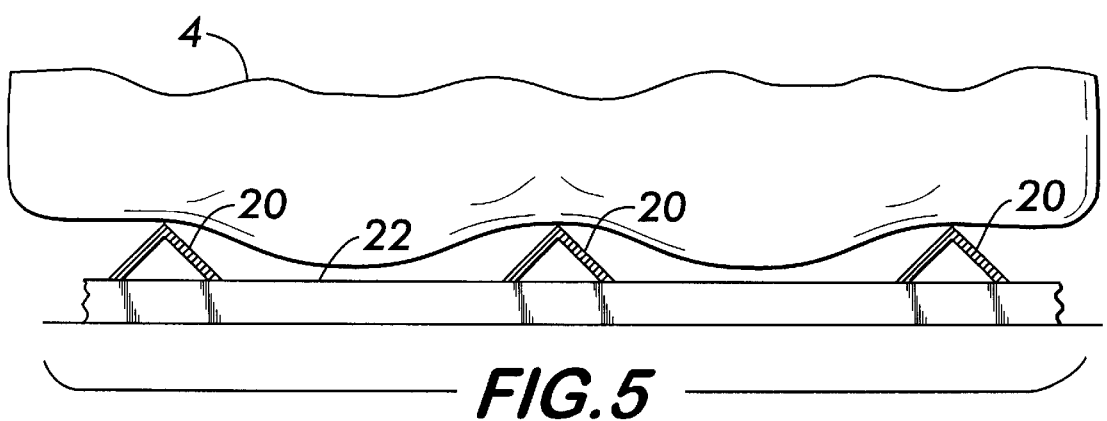
FIG. 5 is a close-up front view, showing the bottom of a bag resting on the bottom bars.

A frame 2, preferably of heavy duty welded tubular metal construction, is provided for receiving and supporting a bulk bag 4 filled with material. The bulk bag is usually of flexible fabric, and when filled, may be a rounded 'square' in perimeter, with sides ranging from 36 to 48 inches. The height of the bag may be from 36 to 72 inches. The bag may be loaded into the receiving area of the frame by a forklift, or by a lifting frame 6 supporting the bag through top loops 8 attached thereto. The portion 10 of the frame which receives the bag is generally in the shape of an open cube or rectangular box. It is advantageous that the frame have one side as a hinged door 12 which opens outwardly to allow introduction of the bag therein.

The receiving portion 10 of the frame may be described as having a bottom portion 14 residing in an x-plane; two opposing sides 16a, 16b residing in parallel y-planes perpendicular to the x-plane; and two opposing sides 18a, 18b residing in z-planes, perpendicular to both the x- and y-planes. The bottom portion 14 preferably has a plurality of fixed, rigid bars 20 extending the width of the bottom portion, or at least for a distance wider than the largest width of a bag residing in the frame. The bars 20 may be self-supporting, or may be additionally supported by braces 22. The bars 20 should be spaced apart, preferably in parallel fashion. When the bag is placed into the frame, and set down upon the bottom bars, the combination of the rigid bars and the spaces therebetween, along with gravity, act to decompact the material in the bottom portion of the bag. It can thus be seen that while at least two bars would be necessary, and up to three or four preferred, a situation wherein too many bars were placed without insufficient spacing would not provide an adequate break-up effect against the compacted material. Nevertheless, larger frames, and different types of materials may allow for a greater number of bottom bars, to be determined by the experience of those skilled in the art.

For the bottom bars 20, and the other break-up bars 30, 40 to be described herein, it is advantageous to provide a cornered or angled profile 24 for maximum breaking effect. In particular, a bar having a cross-sectional 90 degree angle, pointing in the direction of the bag, and having a bisecting line perpendicular to the respective plane (i.e. pointing away from the x-plane in the case of the bottom bars), allows for maximum break-up effect, with excellent stability.

On the two opposing 'y' sides 16a, 16b of the frame, the 'sides' of the rectangular space are comprised of a series of opposing, generally parallel break-up bars 30, preferably running in a horizontal direction parallel to the x plane 14. The spacing and profile shape considerations are generally the same as those for the bottom bars 20. However, in this case, the bars are movable in a direction perpendicular to the y plane 16 in the direction of the arrows A, toward the bag from each respective side. Each bar is pivotably supported on either longitudinal end 28a, 28b by an actuator 32, preferably a heavy-duty air cylinder. While the actuators for each bar are generally operated simultaneously to thrust each bar against the side of the bag, the pivoting action allows for each end of the bar to react to uneven stresses in the bag, without damaging the apparatus. Operators may find that, in this regard, it is beneficial for each end of a bar to thrust forward on a slight delay, for example 0.5 seconds, to prevent lock-up, and to add the benefit of a slight shearing action.

A control panel (not shown) with a programmable logic controller is present to control and energize solenoids, which in turn operate the actuators in a known manner. Typically, opposing bars are operated together, so that the uppermost pair of bars 30a, 30b may be thrust into the side of the bag, and held for a pre-determined period. The holding period may be 15–30 seconds, followed by retraction of the pair of bars. The next lowest pair 30c, 30d may then be operated in turn, with the pattern repeated to the bottom most pair. Generally, the bars may be spaced evenly from the bottom, so that stresses are applied equally through the height of the bag.

On the z plane sides, a further opposing pair 40 of movable bars is provided. In this case, the bars may be vertically oriented (parallel to the y plane), and thrustable in the direction B of the bag, perpendicular to the z plane. Since this pair of z bars will be operating in concert with the y bars 30, it has been found that a single pair of y bars, centered with respect to the intended position of the bag, may be adequate. However, multiple pairs of evenly spaced vertical y bars may also be useful in certain circumstances. Other than the vertical orientation, the z bars 40 are structured and operate in the same manner as the y bars 30.

In operation, the y bars 30 are actuated in series, followed by thrusting of the z bars 40. The sequence is repeated as many times as needed. It may be necessary for the bag to be rotated ¼ turn during the process, to allow for the differing z and y thrusts to be applied to different portions of the bag.

While the bar spacing and thrusting sequences described above have achieved outstanding results, experience and differing circumstances may lead to alternate arrangements. For example, opposing bars may be staggered in height, thrusting action may be achieved by a series of single bars, rather than by opposing pairs, and the overall sequence and timing of the thrusts may be optimized by an experienced operator. In a preferred embodiment, the ends of the bars may be carried in channels on the frame, which allow for height and spacing adjustment of the bars to accommodate bags of differing heights. An optional safety feature may provide that the apparatus will not operate unless the hinged door is secured in the closed position.

In the figures, the hinged door is shown as one of the z sides. This is preferable, as the z side may have only a single bar and set of actuators (and attendant tubing and wiring), and so provides for a less cluttered means of access to the inside of the frame.

While optimum effect may be achieved by having all of the preferred components set forth above, it may be that, in certain circumstances (such as a lower cost option, or less compacted material), fewer than all components may be needed. Thus, a solid bottom portion (or no structural bottom such that the floor supports the bag) may be provided, without bars; or thrustable bars may be provided only on two opposing sides, rather than all four, with maximum break-up achieved by rotation of the bag within the frame.

What is claimed is:

1. An apparatus for the pre-conditioning of materials held in a bulk bag, comprising
   a frame having an open portion for receiving a bulk bag,
   the frame having a bottom portion of the frame, residing in an x plane, for supporting the bag,
   a plurality of bars residing in parallel opposing planes constituting two sides of the open portion, the bars being linearly movable in a direction perpendicular to the sides and toward the open portion.

2. The apparatus of claim 1, wherein a series of horizontal, spaced-apart y bars reside in parallel opposing y planes, the y bars being substantially parallel to the x plane, and being movable in a direction perpendicular to the y plane.

3. The apparatus of claim 2, further comprising vertical z bars residing in parallel opposing z planes, the z bars being substantially parallel to the y plane, and being movable in a direction perpendicular to the z plane and toward the open portion.

4. The apparatus of claim 2, wherein the bars are evenly spaced apart.

5. The apparatus of claim 2, wherein the y bars are provided as opposing pairs residing in opposite y planes, the two bars forming each pair being at an equal height from the bottom portion,
   further comprising a computer processor for controlling the movement of each bar as a forward stroke in the direction of the open portion, and a rearward stroke in the direction away from the open portion,
   wherein each opposing pair is actuated together.

6. The apparatus of claim 5, wherein a complete cycle comprises the actuation of each opposing pair, followed by actuation of a following opposing pair in a controlled, timed sequence.

7. The apparatus of claim 6, further comprising vertical z bars residing in parallel opposing z planes, the z bars being substantially parallel to the y plane, and being movable in a direction perpendicular to the z plane and toward the open portion, wherein the actuation of opposing z bars follows in sequence the complete cycle of the actuation of the y bars.

8. The apparatus of claim 6, wherein the bag is rotated ¼ turn after a pre-defined number of complete cycles.

9. The apparatus of claim 1, wherein the bottom portion comprises a series of parallel, spaced-apart x bars for supporting the bulk bag.

10. The apparatus of claim, 9 wherein the bars are shaped to have a cross-section with an angled portion, an outside of the angled portion directed toward the open portion of the frame.

11. The apparatus of claim 10, wherein the angled portion has an approximately 90 degree angle, with a line bisecting the angle being perpendicular to a plane in which the bar resides.

12. The apparatus of claim 1, wherein each of the bars are actuated by two air cylinders, one of said cylinders attached at either longitudinal end of each bar.

13. The apparatus of claim 12, wherein the air cylinders are pivotally attached to the ends of the bars.

14. The apparatus of claim 1, wherein the bars are provided as pairs residing in opposing sides, each bar of each of said pairs being at substantially the same distance from a common adjoining plane parallel to the bars.

15. The apparatus of claim 1, further comprising vertical z bars residing in parallel opposing z planes, the z bars being substantially parallel to the y plane, and being movable in a direction perpendicular to the z plane and toward the open portion.

16. The apparatus of claim 15, wherein the z bars are present as a single pair of opposing bars, centered between the opposing y sides.

17. The apparatus of claim 1, wherein the bars are shaped to have a cross-section with an angled portion, an outside of the angled portion directed toward the open portion of the frame.

18. The apparatus of claim 17, wherein the angled portion has an approximately 90 degree angle, with a line bisecting the angle being perpendicular to a plane in which the bar resides.

19. The apparatus of claim 1, wherein a side of the open portion is formed as a hinged door, opening outwardly to allow for introduction of a bulk bag into the open portion.

20. The apparatus of claim 1, further comprising a computer processor for controlling the movement of each bar as a forward stroke in the direction of the open portion, and a rearward stroke in the direction away from the open portion.

21. The apparatus of claim 1, wherein the movement of each bar is effected by separately controlling two air cylinders attached to either longitudinal end of each bar.

22. The apparatus of claim 21, wherein the air cylinders are pivotally attached to either end of each bar.

23. The apparatus of claim 22, wherein the two air cylinders are actuated simultaneously.

24. The apparatus of claim 22, wherein the two air cylinders are actuated immediately one after the other.

* * * * *